(12) United States Patent
Li et al.

(10) Patent No.: US 10,372,118 B2
(45) Date of Patent: Aug. 6, 2019

(54) STATE-BASED HIERARCHY ENERGY MODELING (71) Applicant: ROCKWELL AUTOMATION TECHNOLOGIES, INC., Mayfield Heights, OH (US)

(72) Inventors: Linglai Li, Milwaukee, WI (US); Guolin Zhang, Milwaukee, WI (US); David Brandt, New Berlin, WI (US); Fred M. Discenzo, Mayfield Heights, OH (US); Philip Kaufman, Milwaukee, WI (US); David Berman, Milwaukee, WI (US); Phillip Bush, Milwaukee, WI (US); Sean C. Schmelzer, Milwaukee, WI (US); Steven Lombardi, Milwaukee, WI (US); Noel Henderson, Milwaukee, WI (US); Richard A. Morgan, Milwaukee, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 82 days.

(21) Appl. No.: 15/495,466

(22) Filed: Apr. 24, 2017

(65) Prior Publication Data
US 2018/0088567 A1    Mar. 29, 2018

Related U.S. Application Data (60) Provisional application No. 62/399,792, filed on Sep. 26, 2016.

(51) Int. Cl.
*G05B 13/02* (2006.01)
*G05B 19/418* (2006.01)

(52) U.S. Cl.
CPC ......... *G05B 19/41885* (2013.01); *G05B 2219/32338* (2013.01); *G05B 2219/32354* (2013.01);
(Continued)

(58) Field of Classification Search
CPC ................................. G05B 13/042
(Continued)

(56) References Cited

U.S. PATENT DOCUMENTS

9,842,372 B2* 12/2017 Kaufman ............ G06Q 50/06
9,911,163 B2*  3/2018 Kaufman ............ G06Q 50/06
(Continued)

*Primary Examiner* — Suresh Suryawanshi
(74) *Attorney, Agent, or Firm* — Fletcher Yoder, P.C.

(57) ABSTRACT

An energy monitoring system includes a memory storing instructions to execute an energy modeling technique and processing circuitry for executing the instructions to operate the energy modeling technique. The energy modeling technique includes receiving energy data from a plurality of segments representative of one or more logical subgroups. The energy modeling technique includes categorizing the energy data of the logical subgroups into a plurality of segments. The energy modeling technique includes organizing the plurality of segments into a plurality of state-based hierarchical levels. The energy modeling technique includes calculating energy usage and factors associated with the plurality of state-based hierarchical levels via an energy model. The energy modeling technique includes outputting a visualization representative of the energy data corresponding to each of the segments to a monitoring and control system, resulting in a graphical representation accessible by a user-viewable screen.

19 Claims, 7 Drawing Sheets

(52) U.S. Cl.
CPC .............. *G05B 2219/40458* (2013.01); *G05B 2219/42155* (2013.01); *Y02P 90/26* (2015.11)

(58) Field of Classification Search
USPC .......................................................... 700/28
See application file for complete search history.

(56) References Cited

U.S. PATENT DOCUMENTS

| | | | | |
|---|---|---|---|---|
| 2010/0106441 | A1* | 4/2010 | Kidd ........................ | G01H 3/08 |
| | | | | 702/71 |
| 2011/0172838 | A1* | 7/2011 | Pai ......................... | G05B 15/02 |
| | | | | 700/292 |
| 2014/0018971 | A1* | 1/2014 | Ellis ....................... | G06Q 10/04 |
| | | | | 700/297 |
| 2014/0278617 | A1* | 9/2014 | Kaufman ................ | G06Q 50/06 |
| | | | | 705/7.11 |
| 2015/0316904 | A1* | 11/2015 | Govindaraj ........ | G05B 13/0205 |
| | | | | 700/28 |
| 2015/0316909 | A1* | 11/2015 | Govindaraj ............ | G05B 15/02 |
| | | | | 700/19 |
| 2015/0316910 | A1* | 11/2015 | Kalan ................ | G05B 19/4185 |
| | | | | 700/11 |
| 2015/0316911 | A1* | 11/2015 | Rischar .................. | G05B 15/02 |
| | | | | 700/9 |
| 2015/0316922 | A1* | 11/2015 | Rischar ............ | G05B 19/41855 |
| | | | | 700/23 |

\* cited by examiner

| PRODUCTION SEGMENT | MACHINE_X 172 | NON-PRODUCTIVE STATES | | PRODUCTIVE STATES | | PRODUCT TYPE 172 |
|---|---|---|---|---|---|---|
| | | SLEEP | PAUSE | PHASE 1 | PHASE 2 | |
| | | VIRTUAL METER (X_Slp) 174 | VIRTUAL METER (X_Psd) 174 | VIRTUAL METER (X_P1_A) 174 | VIRTUAL METER (X_P2_A) 174 | TYPE_A |
| | | | | VIRTUAL METER (X_P1_B) 174 | VIRTUAL METER (X_P2_B) 174 | TYPE_B |
| METER FOR TOTAL ENERGY | MACHINE_Y 172 | NON-PRODUCTIVE STATES | | PRODUCTIVE STATES | | PRODUCT TYPE 172 |
| | | STOP | | PRODUCE | | |
| | | VIRTUAL METER (Y_Stp) 174 | | VIRTUAL METER (Y_Prd_M) 174 | | TYPE_M |
| | | | | VIRTUAL METER (Y_Prd_N) 174 | | TYPE_N |

STATE-BASED HIERARCHY ENERGY MODELING

CROSS REFERENCE TO RELATED APPLICATIONS

This application claims priority to U.S. Patent Application No. 62/399,792, entitled "State-Based Hierarchy Energy Modeling", filed Sep. 26, 2016, which is herein incorporated by reference.

BACKGROUND

The present disclosure generally relates to an energy model relating to industrial automation systems. More specifically, the present disclosure relates to systems and methods for identifying and incorporating states impacting total energy used in the industrial automation system into the energy model.

Many industrial and commercial settings utilize substantial amounts of energy, in various forms, for production, material handling, welding, machining, melting, crushing, mixing, cooking, freezing, and other operations, which may account for a significant component in the cost of production and operations. In building automation settings, for example, best practices and even operating standards may utilize energy models that are mainly built for total energy consumption based only on simple rules for production schedules and simple weather conditions. Some of the energy usage data may be measured and other data may be estimated. Current approaches are, however, somewhat crude. In factory automation, a common practice is to relate the total energy consumption with production outputs over a given time period, but this relationship is too simple to provide more detailed energy usage patterns to discover inefficiencies and provide optimization opportunities.

There is a need for improved techniques for monitoring, estimating, predicting, modeling, analyzing, and/or controlling energy utilization that offers far more resolution in the analysis of where and how energy is used, permitting improvement in production and other operations, and improved visibility for engineers and managers who oversee such operations.

BRIEF DESCRIPTION

In one embodiment, an energy monitoring system includes a memory storing instructions to execute an energy modeling technique and processing circuitry for executing the instructions to operate the energy modeling technique. The energy modeling technique includes receiving energy data from a plurality of segments representative of one or more logical subgroups. The energy modeling technique includes categorizing the energy data of the logical subgroups into a plurality of segments. The energy modeling technique includes organizing the plurality of segments into a plurality of state-based hierarchical levels. The energy modeling technique includes calculating energy usage and factors associated with the plurality of state-based hierarchical levels via an energy model. The energy modeling technique includes outputting a visualization representative of the energy data corresponding to each of the segments to a monitoring and control system, resulting in a graphical representation accessible by a user-viewable screen.

In another embodiment, a method includes accessing energy utilization and/or production data representative of an enterprise level in an industrial automation system, where the enterprise level data comprises a total energy aggregate value. The method includes disaggregating the enterprise level data into logical subgroups representative of one or more segments. The method includes identifying segments which deviate from an expected performance. The method includes outputting a visual representation of the total energy data corresponding to the segments. The method includes optimizing the industrial automation system based at least in part on the identification of the deviating segments.

In yet another embodiment, a computer-readable medium comprising code is adapted to implement an energy model, where the energy model receives a total energy aggregate value representative of energy usage in an industrial automation system, disaggregates the total energy aggregate value into one or more segments, and identifies the one or more segments which deviate from a threshold performance level.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
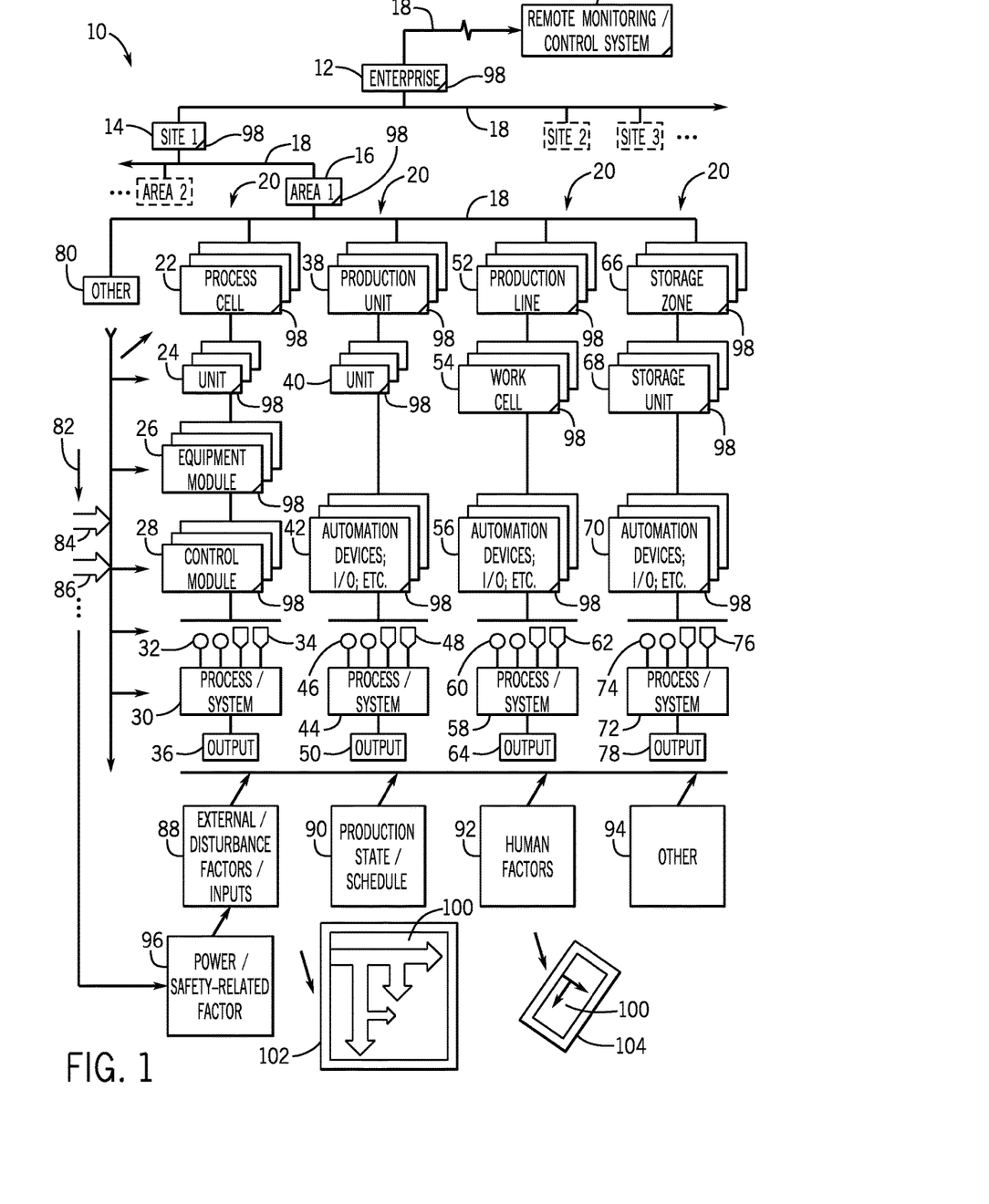
FIG. 1 is a diagrammatical overview of an exemplary enterprise-level automated system instrumented with condition monitors for detecting, storing, processing, and serving data pertaining to energy management of industrial automated systems in accordance with aspects of the present disclosure.

Referring first to FIG. 1, a diagrammatical overview is illustrated of an automated system 10 at the enterprise level 12 applied to an industrial system. The notion of "industrial system" is interpreted broadly here to include a system of complementary energy consumers, energy sources, energy storage modules and energy distribution/routing services. Such systems may be in a manufacturing plant, in mines, on ships or utility power stations. The industrial system may be a batch production system or continuous processing system or a combination of continuous and production systems. The industrial system will include various objects (e.g., machines, work stations, processes, etc.) that will utilize or produce energy. The automated system 10 may be utilized at one or more areas 14, where data is collected, stored, and processed. The data is utilized in an energy modeling technology to provide deep insights into energy usage patterns among other energy related information. The data is also utilized for system optimization and feedback and control of components in the automated system 10. The data is also used to establish the condition or health of machinery, the process, product quality, operator performance degradation of plant services and other process and product related information. Additionally, the energy modeling technology may be applied to different areas 16 in the automated system 10. The areas may utilize the same energy modeling technology or utilize an entirely different energy model better suited to objects in another area. The energy model insights afforded by the modeling may include energy usage patterns under different states and these may be used for various applications benefitting from energy efficiency and optimization (e.g., powering up and down certain systems or devices, scheduling or rescheduling production, power based condition monitoring, etc.). More specifically, the energy model may identify non-operational versus operational energy, identify possible energy wasting or energy saving opportunities, detect potential system fault or energy efficiency problems, process upsets, or quality variability and predict energy needs and optimize production schedules, among other benefits. Additional benefits for example may include establishing product unit-based energy costs and unit-based production costs permitting enhance product and production tracking and providing for tracking and optimizing unit production costs and pricing product according to actual energy and production costs. The energy model as described herein comprises a state-based hierarchy energy model to enhance energy awareness related to loads and activities. States are generally defined as variables with potential relations with energy or power levels. Total energy is disaggregated hierarchically into several levels or phases and then modeled, the results of which may then be utilized to determine how much energy is consumed in a specific machine, for example, or process for producing or processing a specific type of product at some specific production settings. The entire approach is highly scalable and adaptable for specific settings and processes.

One or more energy models may be utilized for a one or more areas 16 in the enterprise level 12. A network 18 (which may actually comprise one or more networks, sub-networks and so forth, which may be wired and/or wireless, and utilizing the same or different data exchange protocols, etc.) links the various components of the system. Each area will include one or more segments 20. Measurements associated with energy factors may include various energy related variables in a given segment 20. Some examples may include energy demand, state, product type, product weight, product identifier, temperature, humidity, product parameters, machine parameters, among others. The energy measurements information and other data will then be transmitted via the network 18. In the illustrated approach, the network 18 transmits the data collected, which is gathered from various segments 20. The energy measurements information is then utilized to determine energy consumption, energy demand profiles, non-production energy usage, production energy usage, among others.

The segments 20 may correspond to an energy variable to be modeled and recorded by a virtual energy meter, along with potential impacting factors including equipment state variables, recipe procedures and parameters, production variables, and equipment condition and environmental variables. In a contemplated industrial automation setting, the segments 20 correspond to different operations of an industrial system. The segments 20 may each be modeled as single modeling units, or as modeling units with subunits. In one example, an industrial production plant operation may include several segments. By way of further example only, the segments may include a cogeneration segment for electricity production, a formulation segment for production of air gases, and a packaging segment for packaging the air gases for distribution. It should again be borne in mind that any industrial production or processing operation may be modeled, and at various and configurable levels that logically correspond to the particular operation. Each of the aforementioned segments will have several energy factors corresponding to the production plant operations. For example, the formulation segment will have several energy factors related to the operation and control of various units 24. In a process industry, for example, the units may include a distillation column for production of liquid nitrogen, oxygen, and specialty gases (e.g., argon, helium, or neon). Other units 24 may include compressors, coolers, recycle pumps, and other equipment. In this example embodiment, each of the units 24 will have at least one energy factor associated with monitoring each unit.

In one segment, the process that takes place within a process cell 22 generates and transmits an electrical signal to the network 18. The process cell 22 utilizes the collected data received from a unit 24 to determine energy efficiency differences among various subunits. For certain enterprise-level integrated control systems (e.g., ISA-95), the levels of the process cell 22 and the unit 24 serve to exchange information between enterprise and control systems about these levels. In an example embodiment, the unit 24 receives energy efficiency data from an equipment module 26. As will be appreciated, energy data collected may also include energy associated with monitoring dynamic operating conditions indicative of abnormal or unwanted conditions, such as wear, impending machinery failure, process problems, sensor fault, uncontrolled disturbances, control instability, incorrect recipe, material problems, quality problems, or excessive loading, among others. Energy data may also include information related to the individual machines or portions of machine systems. When desired, maintenance data may be considered, such as for planned or unplanned maintenance. Such data may assist in planning for maintenance functions, replacement of machine parts, scheduling for maintenance, and scheduling of production, among other things. In some embodiments, the data may be utilized in power analysis algorithms which may have improved ability to detect and diagnose specific faults and to identify faulty equipment or equipment about to fail. The equipment module 26 includes a functional group of equipment which performs a number of processing or production activities. In an exemplary embodiment, the production activity, following the processing industry example, may include delivering a material from a column to a vessel. The equipment module may utilize a pump, an instrument, and several valves to accomplish this production activity. The equipment module will typically perform more than one production activity, often simultaneously.

The equipment module 26 may communicate with a control module 28. Each control module 28 provides a direct connection to the process 30 through actuators 32 and sensors 34. The notion of actuators is used broadly here and includes a broad range of mechanisms for interacting with the environment such linear and rotary actuators, pumps, fans, compressors, furnaces, welders, conveyors, freezers, optical devices and other electromagnetic sources (e.g. microwave and plasma generators). The control module 28 receives a command (e.g., open, close, pump at 100 GPM) to communicate to the process system 30. The commands result in driving the equipment to a state (e.g., opened, closed, set at speed) corresponding to an output 36. The output 36 provides information that can be used for data collection and processing. The resulting data will be utilized further to provide insight into energy efficiency differences among different segments and units when incorporated into an energy modeling technology. Additionally, the output 36 may provide other useful information that may be incorporated into the energy model, such as specific machinery faults (e.g., motoring winding faults, bearing failures), trip points, alarm conditions, and state conditions, among others. In another segment 20, a production unit 38 receives production data from a unit 40. The production unit 38 will provide information about production of a product (e.g., a car, a dryer), materials utilized in making the product, work force data, and other resources utilized in making the product, logistics associated with making the product, capital data, among other information. In a batch production process, the information about the product may pertain to production achieved in a shift, a day, a batch, part of a batch, batch quality, recipe information, such as a breakdown or expected energy use by component, and/or process, or by production unit among other information.

Energy information may also come from automation devices 42. Automation devices may be scalable and provide multi-disciplined control over the operational platform. Automation devices 42 may include servomotors, AC and DC motors, drives, compact drives, motor starters, motor control components, and other devices. Automation devices 42 will address a range of operational data and controls such as implementing specific standards and regulations in industries such as food and beverage, life sciences, specialty chemical, oil and gas, power, and many others. Automation devices 42 provide data used for a variety of reporting structures, allowing for improved visibility into plant performance and opportunities to improve operations as it is utilized in an energy modeling technology. Automation devices 42 will utilize input/output (I/O) communication between an information processing system (e.g., computer, controller) and a remote control monitoring system 106. The outputs may include electrical signals which can be applied to dedicated components, such as motors, alarms, lights, and valves, among others.

Energy information may also be reported from a production line 52. Production line 52 equipment may include automation (integration and robotics), engineering, testing and sorting, and fabrication equipment, among others. The production line 52 may carry out functions such as testing, conveying, sorting, inspection, alignment, and packaging, among others. Information will be collected from each work cell 54 contributing to the production line 52 and utilized in an energy modeling technology. Work cells 54 may be utilized at all once or in stages to enable flexible production schedules and a robust supply chain. Data may be gathered from each work cell pertaining to localized inventory, scheduling, tracking, and delivery, among other areas. Work cell 54 data may include real-time transactions for delivery and transfer schedules, inventory status updates, and production performance including finished goods. Work cell 54 data may be utilized in an energy modeling technology resulting in greater operational efficiency. The automation devices 42 provide a direct connection to the process system 44 through actuators 46 and sensors 48.

In another segment 20, a storage zone 66 receives storage data from a storage unit 68. The storage unit 68 transmits data pertaining to each individual storage unit 68. In an exemplary embodiment, storage units 68 may include storage tanks among other storage equipment. Data associated with the storage tanks may include measurement of tank levels, an alert signaling that product impurities are present, or when tank levels are depleted past a setpoint. In the latter case, instructions may be communicated to signal a valve or other flow control device to open to refill the tank to the appropriate level. In another example, the storage tanks may be controlled to feed product headers for utilization downstream of the storage tanks. The automation devices 56 provide a direct connection to the process system 58 through actuators 60 and sensors 62.

Numerous other 80 sources may contribute to the segments 20 or energy sources which impact the industrial automation system 10. Other 80 sources affecting energy use in the industrial automation system 10 may include equipment and processes utilized in enterprise planning, business planning, operations, control and monitoring of production processes, laboratory equipment, environmental and other ambient conditions, operator proficiency, and testing instrumentation, among others. Energy sources and/or power 82 are utilized to power the various components of automation system 10, including control system equipment, automation devices, process systems, among others. For example, energy source 84 may be compressed air, high or low pressure steam, or other utilities. The energy source 84 may be utilized to drive various machines or other components in the automation system 10. An energy source 86 may be electricity, gas, or another power source. The energy source 86 may be utilized for operation of the various machines and other components via the communication lines in the automation system 10.

External disturbance factors 88 may reduce the efficiency and operation of the automation system 10. Examples of external disturbance factors 88 include electrical noise in a communication system, wind gusts on an antenna or aircraft, and changes in road slope in a vehicle speed control system, among others. Other external disturbance factors 88 may include weather conditions, wind gusts, earthquakes, external shaking and vibration, altitude, water currents, voltage sags or voltage unbalance among others. Issues with a production state/schedule 90 may also reduce the output and operational efficiency of the automation system 10. For example, unexpected events and revisions to production schedules may disturb the system, generating differences between an initial production schedule and the actual realization at the production facility. The production state/ schedule 90 may require adjustments as needed to prioritize jobs that require the same resources, assign resources (people, equipment, or production lines) to jobs, reassign resources from one job to another, and determining when to start, end, or interrupt a job.

Additionally, human factors 92 may also affect the operation and control of the automation system 10. For example, human error may occur due to a faulty operator input to a HMI machine, misinterpreted data, or failure to notice a signal/alarm. Shortage of trained personnel or other human resources related issues such as excessive manual operation may also affect operation of the automation system 10. Numerous other 94 issues and factors may contribute to a loss of operation efficiency and output, such as defective equipment, equipment degradation, power failures, and so forth. Power and safety related factors 96 may also contribute to the operation and control of the automation system 10. For example, power quality issues or supply problems may affect numerous components of the automation system 10. Power outages, blackouts, short term or long term power supply issues may cause one or more components of automation system 10 to fail. Additionally, other power and safety related factors 96 may include rolling brownouts, voltage sags, power surges and spikes, voltage imbalance, electrical noise and harmonic distortion, and may affect the automation system 10.

Here it may be noted that the data collection tasks may be performed by and in ways that are specific to the energy-utilizing (or producing) component or components. For example, electric motor energy utilization data may require detection of currents, voltages, drive frequencies, power factors, and so forth. Natural gas or combustible resources may utilize flow rates, energy values (e.g., from suppliers), and so forth. The sensors used will be selected accordingly, and many may already exist on legacy installations, or may be installed for this purpose. The data collection, and at least some of the signal processing and computations may be performed on the machines themselves, or somewhat locally (e.g., analog-to-digital conversion, power calculations, accumulations of power or other parameters over time, time or period stamping of raw or processed data, etc.). Of course, for such operations, the components performing the functions will be equipped with the required processing circuits (e.g., digital processors, memory circuits, software and firmware comprising instructions for the collection and processing of the data, etc.). Similarly, the components that send and/or receive data will be equipped with network interface circuitry for encoding and/or decoding the data for transmission or receipt over the network. In short, where the term "module" or a term of similar import is used in the present context, it should be understood to include both the hardware (e.g., processing, memory and communications circuitry) as well as the firmware and/or software (e.g., stored in the memory and executed by the processing circuitry) for performing the functions described.

An energy processing module 98 utilizes the robust data collection of automation system 10 to produce a dynamic energy model utilizing various states of the automation system 10. The energy processing module 98 will identify non-production energy and production energy for analyzing energy efficiency. Further, the energy processing module 98 will identify energy efficiency among different subunits (e.g., segments, machines, devices), different product types, and different production parameters among others to discover whether more or less energy is consumed. This information will subsequently determine if a process adjustment, such as energy saving actions, will be implemented.

The energy processing module 98 will identify potential system fault through unusual errors between actual model predicted values and predict future energy consumption based on schedule. Additionally, the energy processing module 98 may estimate the amount of power that will be used and/or observed power anomalies with specific machinery faults. The residual energy use (e.g. difference between predicted energy use and actual observed energy use) will be analyzed and temporal features extracted and static features extracted. The features will serve to classify the residual energy patterns and establish one or more equipment, environment, operator, material or process conditions causing the residual. A decision module will establish what corrective action, if any is warranted, and schedule the action to be taken. The schedule action and time for initiation will be communicated to the model and used in the subsequent analysis of future residuals. Based on comparison between the measured usage and the estimated usage, the energy processing module 98 may update or verify the energy model to infer power usage by the components. The energy processing module 98 will optimize energy consumption and cost to establish an optimal schedule. In one embodiment, the energy processing module 98 may determine the energy required to make a unit of a product (e.g. bag, box, bar, skid, tote, gallon or tank car). The energy processing module 98 may determine energy used based on readings from various sensors. For example, the energy processing module 98 may determine the energy (e.g., heat) included with a product input based on readings from a sensor that measures temperature of the product input. Additionally, sensors may be used to determine other types of energy included with the product input, such as electrical energy, chemical energy, or mechanical energy. The energy processing module 98 may also determine the energy consumed by producing a product. In some embodiments, sensors may be placed upstream of a production segment to measure the amount of energy consumed in a production segment. To improve the diagnostic or prognostic function of the energy usage, the energy processing module 98 may correlate energy usage data to generate energy usage baselines. In some cases, the energy input is estimated based on product temperatures, exhaust temperatures, product weight, acoustic energy or other process parameter other than sampled current and voltage.

A summary/visualization 100 of the energy modeling technique will be produced by the energy processing module 98. The energy modeling technique utilizes data measured, monitored, estimated, inferred, and otherwise collected from automation system 10. The energy modeling technique will be displayed in a summary/visualization 100. The summary/visualization 100 may be displayed by subunit or state level. Other summary/visualizations 100 may be display level by level, period by period, or by other suitable parameters. Similarly the predicted of future estimated energy level may be provided to permit the operator to take action as needed to prevent excessive energy use (e.g. close a dryer door or freezer door inadvertently left open). Additionally, the actual energy use may be displayed along with the actual energy use and an assessment of the reason for the residual provide to the operator. This will permit the operator to further investigate the reason for an unusual residual, take corrective action, or not take any action. Lastly, the energy use and predicted energy use along with process and equipment parameters will be time-stamped and logged into a database or historian. This will permit subsequent more in-depth analysis such as trending or enhanced model development. The summary/visualization 100 may control an amount of components being displayed in the visualization. In one embodiment, the summary/visualization 100 may correspond to a broad or complete view of the components associated with the industrial automation system 10. The summary/visualization will be displayed via a workstation 102, or it may be viewed remotely via a mobile device 104. The summary/visualization 100 will be manipulated through the remote monitoring and control system 106. The remote monitoring and control system 106 may initially display a number of graphics using a number of thumbnail images that may depict an arrangement of the components. For example, the display may include a graphical dashboard of values that may be of interest to the user of the component. In one embodiment, the dashboard of values may include a supply tank level, availability of distribution equipment, and product availability information. The display may also include a visualization of the functions performed by the component and associated energy readings. The display may also include various customizable features regarding the user interface such as tool components, windows, features, menus, and the like based on the respective user. The remote monitoring and control system 106 allows for selective monitoring and control of the automation system 10, though the automation system 10 may also be monitored and controlled locally.

Figure 2:
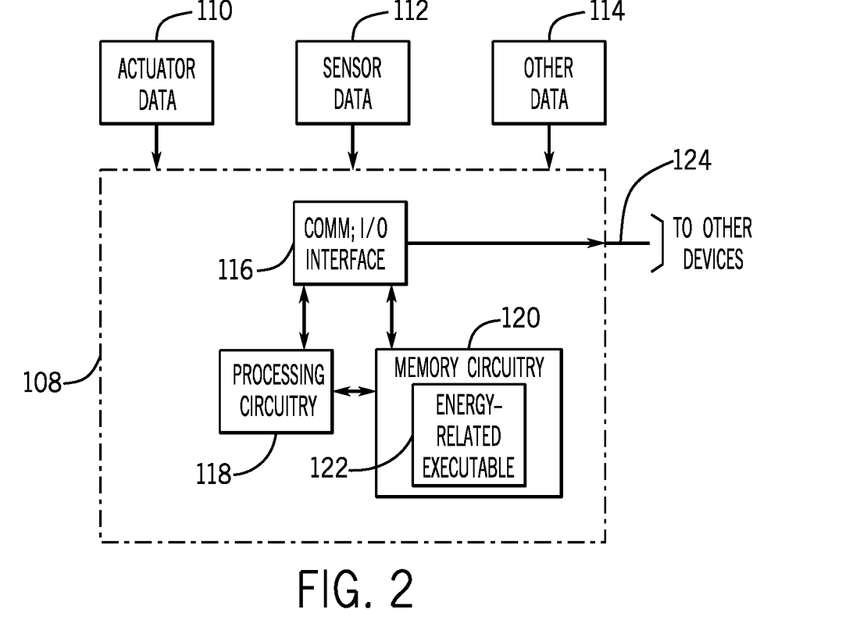
FIG. 2 is a diagrammatical overview of part of an automated system that includes processing circuitry and memory circuitry as determined by the exemplary enterprise-level automated system of FIG. 1, in accordance with an embodiment presented herein.

FIG. 2 is a diagrammatical overview of part of an automated system that includes processing circuitry and memory circuitry as determined by the exemplary enterprise-level automated system of FIG. 1, in accordance with an embodiment presented herein. This model may be further decomposed, following ISA95 concepts, into an area model. An energy monitoring automation component 108 is utilized to receive and process data. Each communication or I/O interface device 116 receives information from input instruments such as gearmotor data or actuator data 110, sensor data 112 (e.g., material composition, temperature), and other data 114. The energy monitoring automation component 108 includes processing circuitry 118 and memory circuitry 120. The communication or I/O interface device 116 communicates with processing circuitry 118 to send output information for processing. The processing circuitry 118 may include specialized processors adapted to process signals sent from various input modules. More specifically, the processing circuitry 118 may include one or more application specific integrated circuits (ASICs), one or more field programmable gate arrays (FPGAs), one or more general purpose processors, or any combination thereof. Additionally, the memory circuitry 120 may include volatile memory, such as random access memory (RAM), and/or non-volatile memory, such as read-only memory (ROM), optical drives, hard disc drives, or solid-state drives.

Embedded within the memory circuitry 120 is an energy related executable 122. In one embodiment, the energy related executable 122 may be a CIP Energy Object. Various energy information consumers have different roles in a plant and therefore different concerns. An important scalability aspect of the energy model is that the same techniques of energy modeling applies at the plant level, the production level, and the internal equipment level, resulting in distinct energy models for each level (e.g., the plant level, the product level, and the internal equipment level). Both ISA95 and ISA88 can utilize the same energy model. The specifications of both ISA95 and ISA88 are hereby incorporated into the present disclosure by reference.

The energy related executables 122 will utilize load control and protection devices if such devices are already required for automation. In some cases the energy related executable 122 is associated with a piece of equipment and can act as a submeter. The energy related executable 122 measurement may be substituted for a term in the energy model. In other cases, several loads inside the equipment have associated energy related executable 122 metering. In addition, the loads and measurements are under control of a programmable automation controller (PAC). Aggregation of the measured values is then computed and reported. The aggregated value may be substituted for a term in the energy model. Energy related executables 122 from standalone loads may be captured in a metering database. In this example, the protocols are extended to read the energy related executable 122 information directly from devices. Memory circuitry 122 communicates with the communication or I/O interface device 116, which sends the output data to other devices 124 such as other plant processes, an energy diagnostics engine or an energy aggregation, analysis and forecasting device. Alternatively the other devices may be virtual devices or cloud-based devices.

Figure 3:
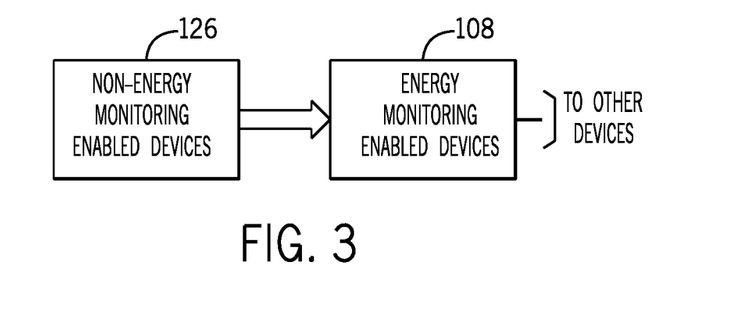
FIG. 3 is a diagrammatical overview of part of an automated system that includes proxy interface components in the way of energy monitoring enabled devices to facilitate communication between the energy monitoring enabled devices and non-energy monitoring enabled devices, in accordance with an embodiment presented herein.

FIG. 3 is a diagrammatical overview of part of an automated system that includes proxy interface components in the way of energy monitoring enabled devices to facilitate communication between the energy monitoring enabled devices and non-energy monitoring enabled devices, in accordance with an embodiment presented herein. Upon analyzing the automation system 10, the energy model may identify one or more legacy components or previously installed components that output data, which newer components of the automation system 10 may be unable to interpret. That is, a first set of components (e.g., newer components, energy monitoring enabled devices 108) in the automation system 10 may not be able to interpret or receive, in some instances, data from a second set of components (e.g., legacy components, non-energy monitoring enabled devices 126) in the automation system 10. The inability of the first set of components to interpret the data acquired by the second set of data may be due to differences between the formats of the data acquired by the second set of components and typically analyzed by the first set of components. As such, the energy model may identify locations within the automation system 10 where proxy-interface components may be added to enable the energy monitoring enabled devices 108 to receive and interpret data output by the non-energy monitoring enabled devices 126. The energy model may then provide a list of devices or components (e.g., proxy-interface components) that may be used to provide an interface between the energy monitoring enabled devices 108 and the non-energy monitoring enabled devices 126.

The proxy-interface components may provide translation services for the non-energy monitoring enabled devices 126 that may provide data in a different format or configuration from which the energy monitoring enabled devices 108 may be designed to interpret. Upon translating the data output by the non-energy monitoring enabled devices 126, the proxy-interface components may forward the translated data to the energy monitoring enabled devices 108, such that the energy monitoring enabled devices 108 may be able to interpret the data provided by the non-energy monitoring enabled devices 126. As a result, the energy monitoring enabled devices 108 may have access to additional data concerning the automation system 10 to operate the automation system more efficiently.

Figure 4:
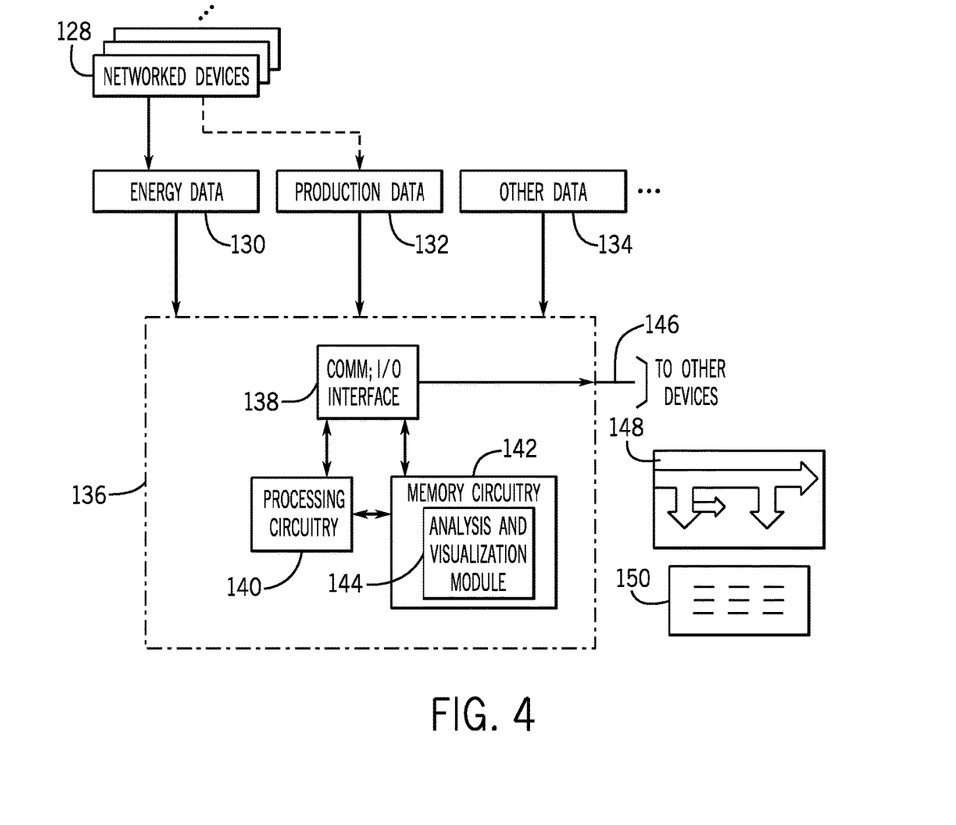
FIG. 4 is a diagrammatical overview of part of an automated system that includes processing circuitry and memory circuitry as determined by the exemplary enterprise-level automated system of FIG. 1, in accordance with an embodiment presented herein.

FIG. 4 is a diagrammatical overview of part of an automated system that includes processing circuitry and memory circuitry as determined by the exemplary enterprise-level automated system of FIG. 1, in accordance with an embodiment presented herein. A networked device 128 may include a number of computers that may be connected through a real-time communication network, such as the Internet, EtherNet/IP, ControlNet, or the like. In one embodiment, large-scale analysis operations may be distributed over the computers that make up the networked device 18. Generally, the computers or computing devices provided by the networked device 128 may be dedicated to performing various types of complex and time-consuming analysis that may include analyzing a large amount of data. As a result, the energy model may provide recommendations to the user using complex data processing algorithms without laboring its own processors with all of the advanced calculations and processing involved in analyzing large amounts of data associated with the user and/or the user's organization, associated industries, related industries, and each respective industrial automation component.

Keeping the foregoing in mind, the networked device 128 may analyze energy data 130, production data 132, and other data 134 pertaining to energy monitoring and utilization in FIG. 1 via a wired or wireless communication network. This model may be further decomposed, following ISA95 concepts, into an area model. An energy analysis enabled automation computer 136 is utilized to receive and process data. Each communication or I/O interface device 138 receives information from input instruments such as energy data 130, production data 132, and other data 134. The energy analysis enabled automation computer 136 includes processing circuitry 140 and memory circuitry 142. The communication or I/O interface device 138 communicates with processing circuitry 140. The processing circuitry 140 includes specialized processors adapted to process signals sent from various input modules. More specifically, the processing circuitry 140 may include one or more application specific integrated circuits (ASICs), one or more field programmable gate arrays (FPGAs), one or more general purpose processors, or any combination thereof. Additionally, the memory circuitry 142 may include volatile memory, such as random access memory (RAM), and/or non-volatile memory, such as read-only memory (ROM), optical drives, hard disc drives, or solid-state drives.

Embedded within the memory circuitry 142 is an analysis and visualization module 144. The analysis and visualization module 144 utilizes information received pertaining to energy data 130, production data 132, and other data 134, such as equipment performance, deviation from expected performance, among many others to produce energy usage patterns. An expected performance level may be a predicted level based on analytic, stochastic, and/or model-free estimators of future performance. The deviation from the expected performance (i.e., residual level) may be classified and mapped to a variety of anomalous conditions to identify equipment, process, operator, environmental or other factors affecting energy consumption, operational performance and product quality. It may be appreciated that known disturbances may be injected into the system. For example, slight changes in a process setpoint and the system response to the change may be analyzed to further establish an estimated equipment or process state (e.g., system identification process) or to enhance the process and energy model (e.g., dynamic model adaptation). The energy usage patterns produce multi-dimensional awareness about various components of the automation system 10, such as energy usage patterns among subunits, production states, operating states, product types, and many more. Various energy information consumers have different roles in a plant and therefore different concerns. An important scalability aspect of the energy model is that the same techniques of energy modeling applies at each of the plant level, the production level, and the internal equipment level, resulting in distinct energy models for each level (e.g., the plant level, the product level, and the internal equipment level). Both ISA95 and ISA88 can utilize the same energy model. The visualization and analysis data 146 created from the analysis and visualization module 144 is output to the communication or I/O interface device 138 and subsequently sent to other devices. A visualization 148 encompassing the visualization and analysis data 146 communicates to the user numerous energy usage patterns produced by the input data (e.g., energy data 130, production data 132, and other data 134). An analysis sensor 150 may be used to determine the power supplied to a component or a group of components. The visualization 148 encompassing the visualization and analysis data 146 may display the total power supplied to a first motor drive. The power supplied to the first motor drive may be used partially by the first motor drive and may partially supply a motor. As such, the amount of power supplied to the motor may be determined by subtracting the power used by the first motor drive from a total power supplied.

Figure 5:
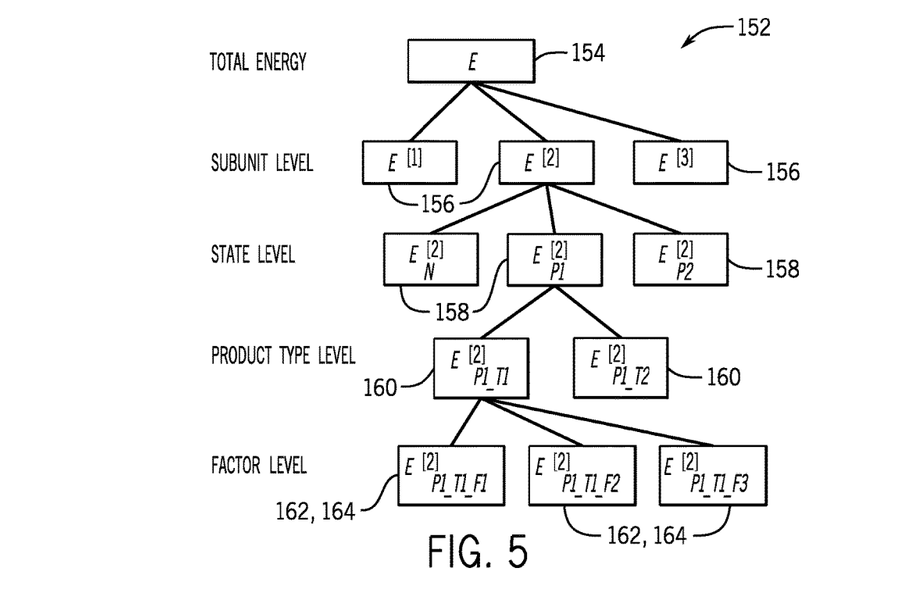
FIG. 5 is a diagrammatical overview of a hierarchical energy model utilized in the automated system of FIG. 1 to provide deeper insights pertaining to energy usage patterns.

FIG. 5 is a diagrammatical overview of a hierarchical energy model utilized in the automated system to provide deeper insights pertaining to energy usage patterns. As discussed above, the state-based hierarchy energy model enhances energy awareness related to loads and activities. Conventional energy models correlate energy awareness to a few basic variables, such as production outputs and temperatures. The energy model 152 provides a multi-dimensional awareness about various components of the automation system 10, such as energy usage patterns among subunits, production states, operating states, product types, and many more. As explained below, the energy model 152 categorizes the input factors into various levels (e.g., state categories, product categories, condition categories). A modeling objecting such as an energy total E, 154 is a metered value composed of a summation of energy terms. The most basic term $E^{[n]}$ represents the energy at the subunit level 156 or equipment level (e.g., a complex load), where the energy total is the sum of the energy of the loads. For example, the subunit level 156 could include a workstation that is a subunit level 156 of a factory. In another example, the subunit level 156 could include a machine that is a subunit of a production line.

Each load term $E^{[n]}$ may then be decomposed into the energy for each of the complex states at the state level 158 of the load. As described herein, the complex states may include a combination of states and/or hierarchical factors. The complex state may include information from a subunit, a state, a product type, among others. For example, a complex state may be described as (Sub_1, State_2, Product_3, Factor_4), (Sub_4, State_3, Product_2, Factor_1), among numerous other complex states. As discussed above, states are defined as variables with potential relations with energy or power levels. The energy at the state level 158 may be measured for both producing and non-producing) ($E_N$, $E_{P1}$, $E_{P2}$, ..., $E_{Pn}$) states. Additionally, each state term may be further decomposed by product type ($E_{Pn\_T1}$, $E_{Pn\_T2}$, ..., $E_{Pn\_Tm}$) at the product type level 160. The product type level (sub-state) measures the energy for producing different types of products. A final decomposition is utilized to account for an energy factor, such as temperature, product number/weight, machine parameters ($E_{Pn\_Tm\_F1}$, $E_{Pn\_Tm\_F2}$, ..., $E_{Pn\_Tm\_Fk}$) at the factor level 162. Any relevant factor may be included within the model. As such, the total energy is disaggregated hierarchically into several levels and then modeled. It is possible to know from the model how much energy is consumed in a specific state at specific production settings. In an example embodiment of the energy model, the energy model may be expressed as an equation:

$$E = \Sigma_{k_S}(\Sigma_{k_N} E_{N(k_N)}^{[k_S]} + \Sigma_{k_P}\Sigma_{k_T} E_{P(k_P)\_T(k_T)}^{[k_S]})$$

wherein $k_S$ is the index for the subunit (or equipment) 1...N, $k_N$ is the index for non-productive states, so $E_{N(k_N)}^{[k_S]}$ means the energy of $k_S$-th subunit under the $k_N$-th non-productive state, $k_P$ is the index for productive states, $k_T$ is the index for product type, so $E_{P(k_P)\_T(k_T)}^{[k_S]}$ means the energy of $k_S$-th subunit under $k_P$-th productive state to produce $k_T$-th product, and $k_F$ is the index for factor, which may include product number/weight, and temperature, among many other factors. Non-productive states include those states under which the energy or power has no relationship with the production output and parameters. Under these states, no production occurs, but energy is still consumed due to control requirements or it is wasted. Productive states under which the energy or power are impacted by production variables such as product type, numbers, and production parameters. Under these states, products are produced that have an impact on power level and energy consumption. The state-based hierarchy energy model may utilize different model forms for non-productive and productive states.

Each element, including the equipment level or a subunit level 156, state level 158, product type level 160, and factor level 162, has a corresponding complex state 164 which contributes to E. The complex state can be a combination of each of the elements, including, but not limited to, the equipment level or a subunit level 156, the state level 158, the product type level 160, and the factor level 162, which can be included in a complex state vector 166. The historical data contains variations of each portion of the complex states 164. Each complex state 164 utilizes a combination of the hierarchical levels. The complex states 164 incorporated in the complex state vector 166 may be active or inactive at a specific period such that each complex state turns on or turns off its own meter in the total energy metering.

In one example, utilizing the state-based hierarchy energy model can reveal energy consumption of each subunit. For example, in predicting the energy consumption of multiple dryers (e.g., Dryer 1, Dryer 2, and Dryer 3) in a batch, the state-based hierarchy energy model can reveal the energy consumption of each dryer for different product types. Energy efficiency under different conditions can be identified, as well as the impact from temperature. For example, at the same conditions, Dryer 1 may consume less energy while Dryer 3 consumes more energy. In another example, each of the dryers may utilize approximately the same amount of energy to stop production, but the exact amount of energy utilized to stop Dryer 1, Dryer 2, and Dryer 3 can be differentiated. Over time, historical data is collected from each of the dryers. This historical data is then utilized in the state-based hierarchy energy model to reveal non-operational versus operational energy, identify possible energy waste or energy saving opportunities, detect potential system fault or energy efficiency problems, and predict energy needs and optimize production schedules for each of the dryers.

Figure 6:
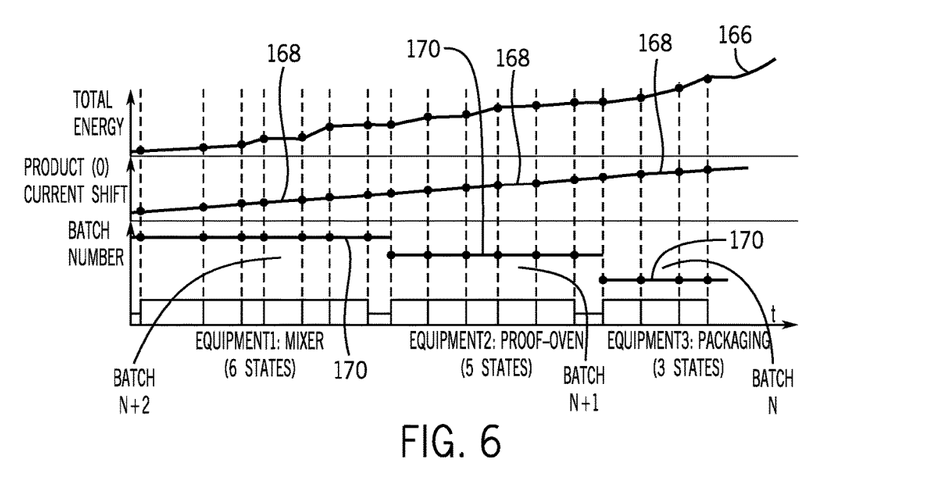
FIG. 6 is a graph depicting the relationship between total energy to energy segments and energy states.

FIG. 6 is a graph depicting the relationship between total energy to energy segments and energy states. Activity-based awareness and virtual metering can be utilized to gain insight into the true cost of a manufacturing process or state and establish meaningful performance based metrics. These performance based metrics are then able to be captured and utilized at an individual device level to optimize efficiency and reduce total energy 166 consumption. As such, the energy model captures system insights from each of the energy segments 168 and each of the multiple energy states 170 (e.g., three, four, five, six, or more energy states) that the energy segments 168 include. In one example, an energy model can be applied to a home. For example, a meter may be utilized to determine the energy consuming equipment in the home has a 100 Watt load. All of the energy segments 168 (e.g., energy consuming equipment) contribute to the composite load of 100 Watts with a composite state. By storing historical data for the energy segments 168 and the energy states 170, the energy model can be utilized to gain insight on new loads. For example, by compiling enough historical data from shutdown to full operation, insight into the load sizes is possible. The energy model can provide virtual energy meters for subunits of a segment to estimate energy consumption of each subunit from the states. In other words, no real energy meter is installed on the subunits for utilization in the energy model. The data provided from the virtual energy meters allows users to gather more information about the energy usage pattern and efficiency among different subunits from the virtual energy meters. Other than total energy modeling of an energy segment 168, the model can provide an energy hierarchy, thus providing more dimensions for insight of the energy consumption. The total energy 166 consumption can be divided into individual parts at different conditions (e.g., by subunits, by states, by product type) to discover other efficiency problems.

In FIG. 6, the total energy 166 corresponds to a single meter (or several meters added together) measuring the energy consumption of the three pieces of equipment (e.g., a mixer, a proof-oven and a packaging machine). Each piece of equipment performs a unique batch step or ISA95 segment that together complete a batch of final products. The total energy difference can be measured across each segment interval. Historical capture of this segment interval energy can be analyzed for per product energy and per manufacturing step energy. Each piece of equipment also has a number of internal states (e.g., ISA88 states) that are followed to complete a segment. The total energy difference can be measured across each state interval. Historical data capture of this state interval energy can be analyzed for equipment performance. It is also possible for the three pieces of equipment to operate in parallel. The energy segments 168 together then form a composite state. The internal energy states 170 (e.g., equipment states) can also be used to form a composite state with increased resolution. It may be appreciated that during the operation of the equipment (e.g., a mixer, a proof-oven and a packaging machine), each piece of equipment may have a separate batch. Each piece of equipment's energy usage may be analyzed separately, or the total energy usage of producing the batch may be determined from the three pieces of equipment (e.g., a mixer, a proof-oven and a packaging machine).

Figure 7:
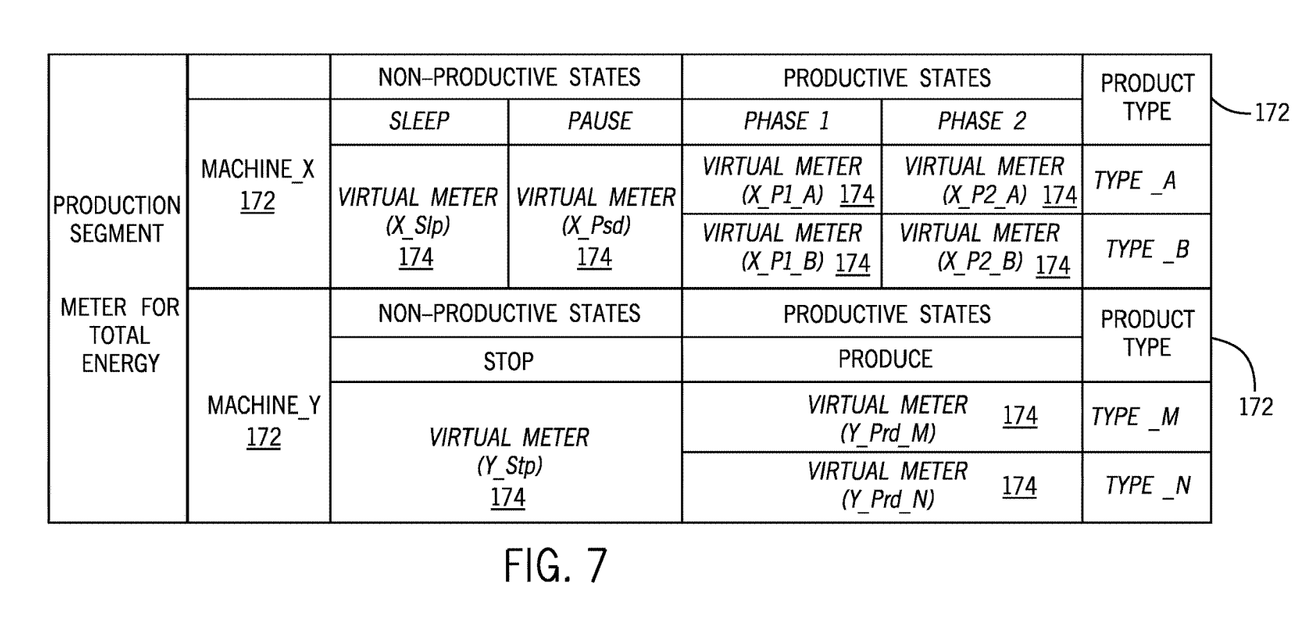
FIG. 7 is a diagrammatical overview of a tree hierarchy by a summation of nodes from which the state based hierarchical energy model is derived.

FIG. 7 is a diagrammatical overview of a tree hierarchy by a summation of nodes from which the state based hierarchical energy model is derived. As such, FIG. 7 depicts the relationship between the variables 172 utilized in the energy model of FIG. 5 compared to the virtual energy meters 174. As shown in FIG. 7, if the composite state changes, some virtual energy meters 174 stop accumulating data and other virtual energy meters 174 begin accumulating data. Depending in the rate of consumption, the virtual energy meters 174 run at different rates. A term coefficient (implicit within each term) is proportional to the rate. For example, for a stand-alone non-producing state, the power of the non-producing state is nearly constant. As such, the coefficient will not be adjusted frequently. In another example, there may be more complex cases where other coefficients are related to other factors such as temperatures. In such cases, the coefficients may be adjusted more frequently to account for the changes associated with the non-constant energy factors (e.g., temperature). The energy accumulated in a given virtual energy meter 174 can be calculated through integration once the energy coefficient is known. In one example, a specific state, such as a productive state 176, produces several products. Each state, product, and product combination utilizes its own virtual energy meter 174. Further extensions of the concept may include utilizing virtual energy meters 174 for equipment settings or environmental conditions, among other variables 172. In one embodiment, the energy model may be entered as a tree hierarchy or directory structure, with a top node functioning as a total energy meter for the area 16 or segment 20. In one embodiment, entries for each load are systemically arranged beneath the top node. Entries for a state corresponding to each load are systemically arranged beneath the load entries. In one embodiment, the energy model (without the coefficients) may be derived from the tree hierarchy by a summation of the nodes back to the root from the leaf nodes. In some embodiments, each entry in the hierarchy may then be configured to point to the relevant historical records. An iterative process may then be run to calculate and validate the coefficients for the energy model.

In order to calculate the term coefficients for the energy model, historical data is utilized. The historical data includes total energy measurements and state information for each load, among other energy data such as production and condition related data. By a mathematical method of multiple regression (e.g., linear and/or non-linear regressions), the data set for a historical period is processed to calculate the coefficients for the energy model. It may be assumed that state variation exists within the historical period, such that energy variations occur and coefficients can be calculated. The energy modeling process subsequently utilizes other remaining historical data set having adequate variations to check the energy model. It may be appreciated that historical data may be utilized in some energy modeling techniques (e.g., batch algorithms). Recursive energy modeling algorithms utilized by the energy modeling techniques disclosed herein may not use historical data.

As such, the energy model may be run against a second historical period (e.g., a second half of the total history) to predict the total energy trend across this second period from the historical state records. This energy trend is then compared to the historical energy records to check the accuracy of the energy model. If the energy model is not as accurate as desired, different (e.g., better or longer) historical periods may be utilized to complete the energy model. If the accuracy of the energy model is still not as robust as the user desires, additional energy factors may be utilized to expand and optimize the energy model. Additional energy factors, such as product, equipment settings, and environmental conditions, among others, may be added to the energy model to refine the energy model in a step-wise manner. In this way, the energy model is optimized to the desired accuracy with the minimal effort, while the effect of different factors in the energy consumption is learned. It should be further noted that it is not required to store the historical data, though analyses of historical data may help with fine tuning the model(s) in some instances. Calculation of the term coefficients for the model can be made from total energy measurements and real time state information. By the same method, the coefficient accuracy can be determined by utilizing additional real time state information.

Figure 8:
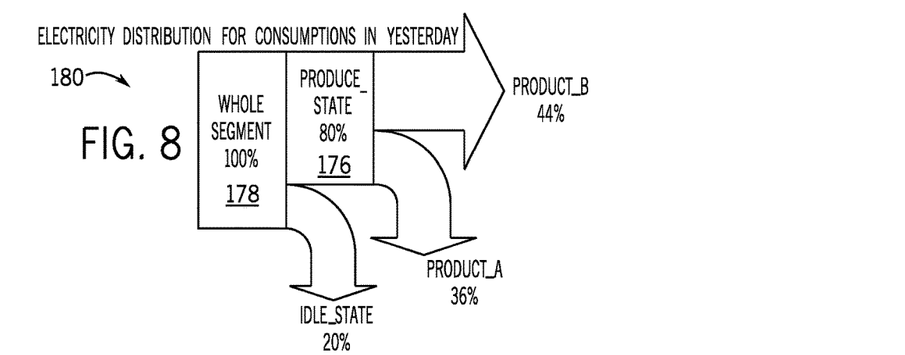
FIG. 8 is a diagrammatical overview of state-based hierarchy energy model as an aggregation of numerous different complex states.

FIG. 8 is a diagrammatical overview of state-based hierarchy energy model as an aggregation of numerous different complex states. The energy modeling unit represents a combination of factors contributing to the complex state vector 166. For example, each production segment 176 contributes to the total energy 180 of the whole segment 178. The production segments 176 correspond to energy variables, accompanied with impacting factors, including state variables, production variables, condition and environmental variables, among others. The historical data will contain variations of each portion of the complex states. For example, in one embodiment, the state may be modeled first. The state-based hierarchy energy model may be utilized to gain insight that a system expends ⅘ of its total energy 180 in producing various products. The energy model can be utilized to determine the total amount of energy utilized to produce a first product (e.g., Product A) and to determine the total amount of energy utilized to produce a second product (e.g., Product B). Perhaps more importantly, the state-based hierarchy energy model can be utilized to determine ⅕ of the total energy is expended while in the idle state. Utilizing this system insight, energy optimization and savings mechanisms can be implemented.

Figure 9:
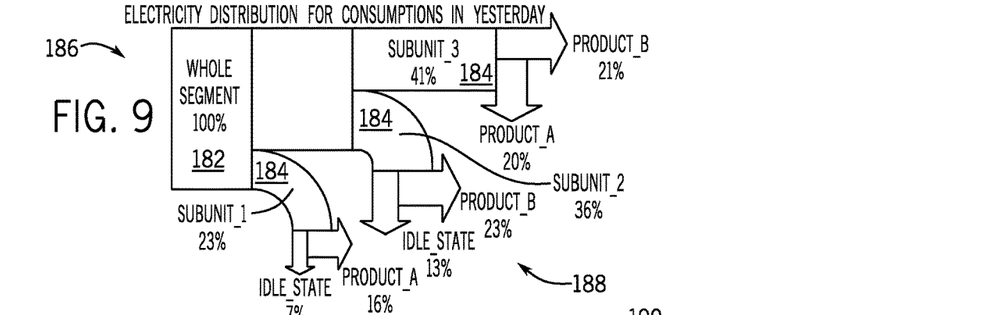
FIG. 9 is a diagrammatical overview of state-based hierarchy energy model as an aggregation of numerous different complex states, divided by subunit.

FIG. 9 is a diagrammatical overview of state-based hierarchy energy model as an aggregation of numerous different complex states, first divided by subunit. As described above, the energy modeling unit represents a combination of factors contributing to the complex state vector 166. For example, each element contributes to the total energy 186 of the whole segment 182. The whole segment 182 may be divided by subunit 184 firstly. The state-based hierarchy energy model may be utilized to gain insight that a system expended over ⅔ of its total energy in a given subunit 184 (e.g., subunit 3). The user can then utilize this system insight to determine if the energy consumption of the subunit 184 is acceptable in terms of capital expenditure, regulations, internal policies, and other factors. Similarly, the user can utilize the system insight to determine if the energy consumption of the products (e.g., Product A and Product B) produced by the subunit 184 are acceptable in a similar manner. As will be appreciated, the state-based hierarchy energy model may provide energy usage information pertaining to idle states 188. That is, the user can utilize the system insight to determine if the energy consumption of the subunit 184 (e.g., subunit 2) corresponding to the idle state 188 is acceptable. If the user determines the energy consumption of an idle state 188 is unacceptable, appropriate system changes can be made to reallocate energy usage, change production schedules or cycles, eliminate or replace subunits, among other optimization and efficiency actions.

Figure 10:
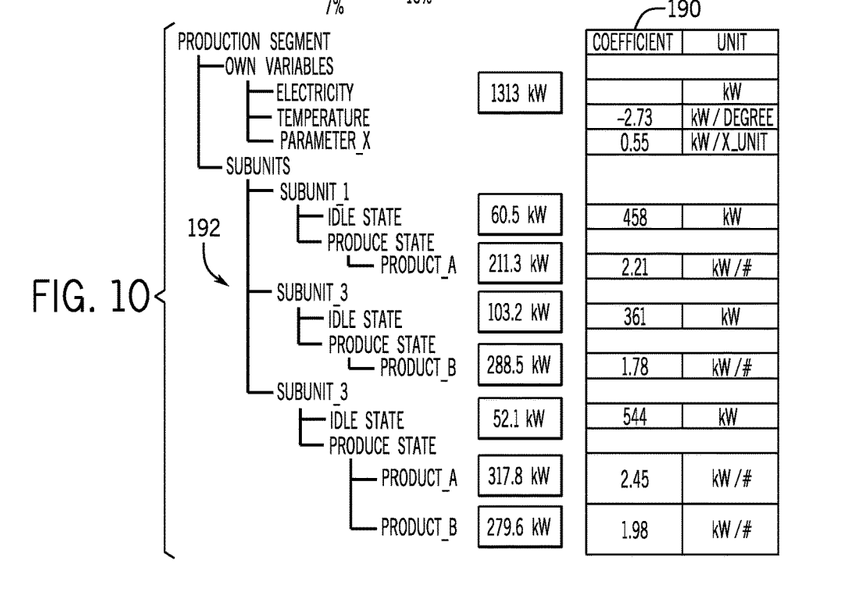
FIG. 10 is a diagrammatical overview of an embodiment of the state-based hierarchy energy model showing calculated coefficients utilized for various subunits.

FIG. 10 is a diagrammatical overview of an embodiment of the state-based hierarchy energy model having utilized linear regressions to determine coefficients. In one embodiment, the state-based hierarchy energy modeling results can be utilized to calculate coefficients 190 for electricity. Based on the state-based hierarchy model, prediction of total energy consumption is allowed. Not only can the total energy consumption be predicted, but the energy consumption of each subunit 192 can be predicted. Additionally, within each subunit 192, electricity consumption can be determine for a production state associated with producing a given product or an idle state. Some coefficients 190 will yield a negative result, indicating a negative correlation between the total energy and a given variable (e.g., temperature). For example, the coefficient −2.73 indicates that as one variable increases, the other decreases, and vice versa. Some coefficients 190 will yield a positive result, indicating a positive correlation between the total energy and a given variable (e.g., production). A positive correlation coefficient means that as the value of one variable increases, the value of the other variable increases; as one decreases the other decreases. As will be appreciated, an estimate or prediction of how much electricity is consumed under an idle state can help identify non-production energy compared to production energy. As such, energy waste can be minimized and the automation system optimized.

Figure 11:
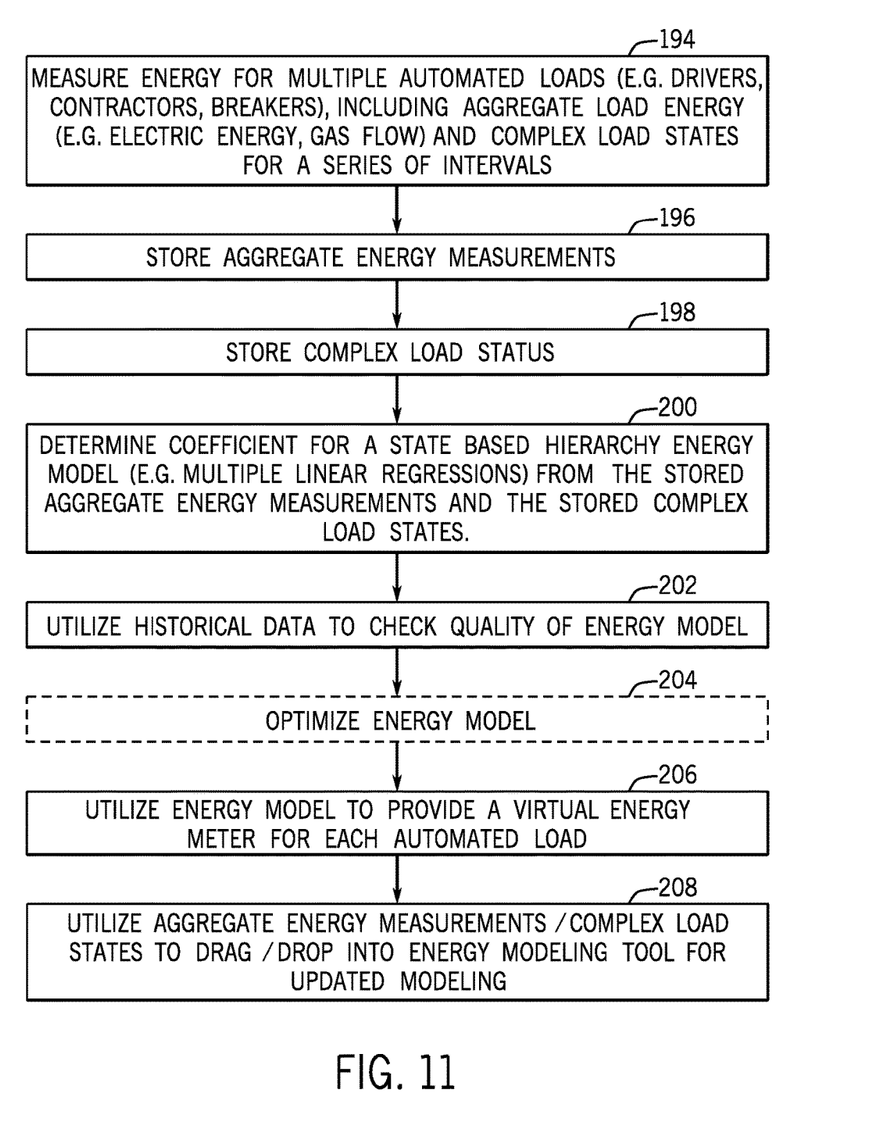
FIG. 11 is a flow chart illustrating an embodiment of a method for creating and optimizing a state-based hierarchy energy model utilizing stored aggregate energy measurements and stored complex load states.

FIG. 11 is a flow chart illustrating an embodiment of a method for creating and optimizing a state-based hierarchy energy model utilizing storage aggregate energy measurements and stored complex load states. The energy for multiple automated loads (e.g., drivers, contractors) is measured (block 194). The energy measurements include aggregate load energy (e.g., electric energy, gas flow) and complex load states for a series of intervals. Both the aggregate energy measurements (block 196) and complex load states (block 198) are stored for utilization in the state-based hierarchy energy model. As such, coefficients for the state-based hierarchy energy model are determined by utilizing the stored aggregate energy measurements and the store complex load states (block 200). In some embodiments, the coefficients will be determined by utilizing the stored aggregate energy measurements and store complex load states in multiple linear and/or multiple non-linear regressions. Historical data is then utilized to check the quality of the state-based hierarchy energy model created (block 202). In some embodiments, the state-based hierarchy energy model (block 204) is optimized to provide a more accurate energy model. As such, if the energy model is not as accurate as desired, different (e.g., better or longer) historical periods may be utilized to complete the energy model. The state-based hierarchy energy model is then utilized to provide a virtual energy meter for each automated load (block 206). As the virtual energy meters continue to provide data for the energy model, the aggregated energy measurements and complex load states are dragged/dropped into an energy modeling tool for updated energy modeling (block 208). It may be appreciated that different energy meters will correspond to different energy models.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An energy monitoring system, comprising:
a memory storing instructions to execute an energy modeling technique;
processing circuitry configured to execute the instructions to operate the energy modeling technique, wherein the energy modeling technique comprises:
receiving energy data acquired from a plurality of sensors associated with a plurality of segments representative of one or more logical subgroups in an industrial system;
categorizing the energy data of the logical subgroups into a plurality of segments;
organizing the plurality of segments into a plurality of state-based hierarchical levels, wherein each of the plurality of state-based hierarchical levels is organized based on a plurality of production settings for the industrial system;
calculating energy usage and factors associated with the plurality of state-based hierarchical levels via an energy model; and
utilizing the energy usage and factors to adjust one or more operations of the industrial system.

2. The energy monitoring system of claim 1, wherein the energy data represents energy usage patterns comprising energy consumption data, production data, process data, or any combination thereof.

3. The energy monitoring system of claim 1, wherein the plurality of segments comprises one or more of a process cell, a production unit, a production line, a storage zone, or any combination thereof.

4. The energy monitoring system of claim 1, wherein the state-based hierarchical levels comprises an equipment level, a state level, a product type level, a factor level, or any combination thereof.

5. The energy monitoring system of claim 1, wherein the energy monitoring system comprises an energy related executable object.

6. The energy monitoring system of claim 1, wherein the plurality of state-based hierarchical levels comprises energy producing and non-producing levels.

7. The energy monitoring system of claim 1, wherein the energy modeling technique disaggregates total energy into the plurality of state-based hierarchical levels.

8. The energy monitoring system of claim 1, wherein the energy usage and factors comprise temperature, humidity, product weight, product identifier, product parameters, machine parameters, operator identification, or any combination thereof.

9. The energy monitoring system of claim 1, wherein the plurality of segments comprises one or more units, one or more work cells, one or more storage units, or any combination thereof.

10. A method, comprising:
receiving, via a processor, energy utilization and/or production data acquired from a plurality of sensors representative of an enterprise level in an industrial automation system, wherein the enterprise level data comprises a total energy aggregate value for the industrial automation system;
disaggregating, via the processor, the enterprise level data into logical subgroups representative of a plurality of state-based hierarchical levels of the industrial automation system, wherein each of the plurality of state-based hierarchical levels is organized based on a plurality of production settings for the industrial automation system;
identifying, via the processor, one or more state-based hierarchical levels of the plurality of state-based hierarchical levels which deviate from an expected performance;
adjusting, via the processor, one or more operations of the industrial automation system based on a portion of the total energy data corresponding to the one or more state-based hierarchical levels, wherein the one or more operations are configured to optimize the plurality of production settings.

11. The method of claim 10, wherein disaggregating the enterprise level data into the plurality of logical subgroups comprises identifying producing and non-producing energy states.

12. The method of claim 10, wherein disaggregating the enterprise level data into the plurality of logical subgroups comprises analyzing the plurality of state-based hierarchical levels comprising a process cell, a production unit, a production line, a storage zone, or any combination thereof.

13. The method of claim 10, wherein identifying the one or more state-based hierarchical levels comprises utilizing an analysis and visualization module to identify one or more deviations from the expected performance.

14. The method of claim 10, comprising outputting a visual representation of the total energy data with respect to producing energy usage patterns.

15. A computer-readable medium comprising code, when executed by a processor, is adapted to cause the processor to:
receive a total energy aggregate value representative of energy usage in an industrial automation system based on energy data acquired from a plurality of sensors;
disaggregate the total energy aggregate value into disaggregated energy values for a plurality of state-based hierarchical levels of the industrial automation system, wherein each of the plurality of state-based hierarchical levels is organized based on a plurality of production settings for the industrial automation system;
identify one or more state-based hierarchical levels of the plurality of state-based hierarchical levels that deviate from a threshold performance level based on the disaggregated energy values; and
adjust one or more operations of the industrial automation system based in part on the identification of the one or more state-based hierarchical levels.

16. The computer-readable medium of claim 15, wherein the code is adapted to cause the processor to adjust the one or more operations of the industrial automation system by controlling a set of operations of equipment or a process in the industrial automation system.

17. The computer-readable medium of claim 16, wherein the set of operations is controlled based on the energy data.

18. The computer-readable medium of claim 17, wherein inputs from the plurality of sensors comprise equipment or process constraints received from the industrial automation system, equipment or process limits, or a combination thereof.

19. The computer-readable medium of claim 17, wherein the set of operations is associated with a flow rate, equipment settings, reaction rates, residence times, actuator settings, or a combination thereof.

* * * * *